United States Patent [19]
Watanabe

[11] Patent Number: 5,718,875
[45] Date of Patent: Feb. 17, 1998

[54] PROCESS FOR PRODUCING AMMONIUM POLYPHOSPHATE OF CRYSTALLINE FORM II

[75] Inventor: Makoto Watanabe, Aichi, Japan

[73] Assignee: Chisso Corporation, Osaka, Japan

[21] Appl. No.: 580,420

[22] Filed: Dec. 28, 1995

[30] Foreign Application Priority Data

Jan. 12, 1995 [JP] Japan ................................. 7-020932

[51] Int. Cl.$^6$ ................................................. C01B 25/40
[52] U.S. Cl. ............................................. 423/305; 423/315
[58] Field of Search ..................................... 423/305, 315

[56] References Cited

U.S. PATENT DOCUMENTS

| | | | |
|---|---|---|---|
| 3,333,921 | 8/1967 | Knollmueller | 423/315 |
| 3,397,035 | 8/1968 | Shen et al. | 23/106 |

FOREIGN PATENT DOCUMENTS

| | | | |
|---|---|---|---|
| 22318 | 6/1974 | Japan | 423/315 |

OTHER PUBLICATIONS

Chemical Abstracts 92(18): 155, Abstract No. 149371d (May 5, 1980).

"Preparation and Characterization of Crystalline Long-Chain Ammonium Polyphosphates", Shen et al., Journal of the American Chemical Society, vol. 91, pp. 62–67, Jan. 1, 1969.

*Primary Examiner*—Wayne Langel
*Attorney, Agent, or Firm*—Leydig, Voit & Mayer, Ltd.

[57] ABSTRACT

A process for producing ammonium polyphosphate of crystalline form II is described, which comprises heating a mixture of a phosphate-containing substance and a condensation agent in an ammoniacal wet air atmosphere in the presence of ammonium polyphosphate of crystalline form II as a compound for crystal formation (seed compound) to condense the phosphate-containing substance with the condensation agent.

6 Claims, 2 Drawing Sheets

X-RAY DIFFRACTION PATTERN OF THE AMMONIUM POLYPHOSPHATE OBTAINED IN EXAMPLE 1

X-RAY DIFFRACTION PATTERN OF THE AMMONIUM POLYPHOSPHATE OBTAINED IN COMPARATIVE EXAMPLE 2

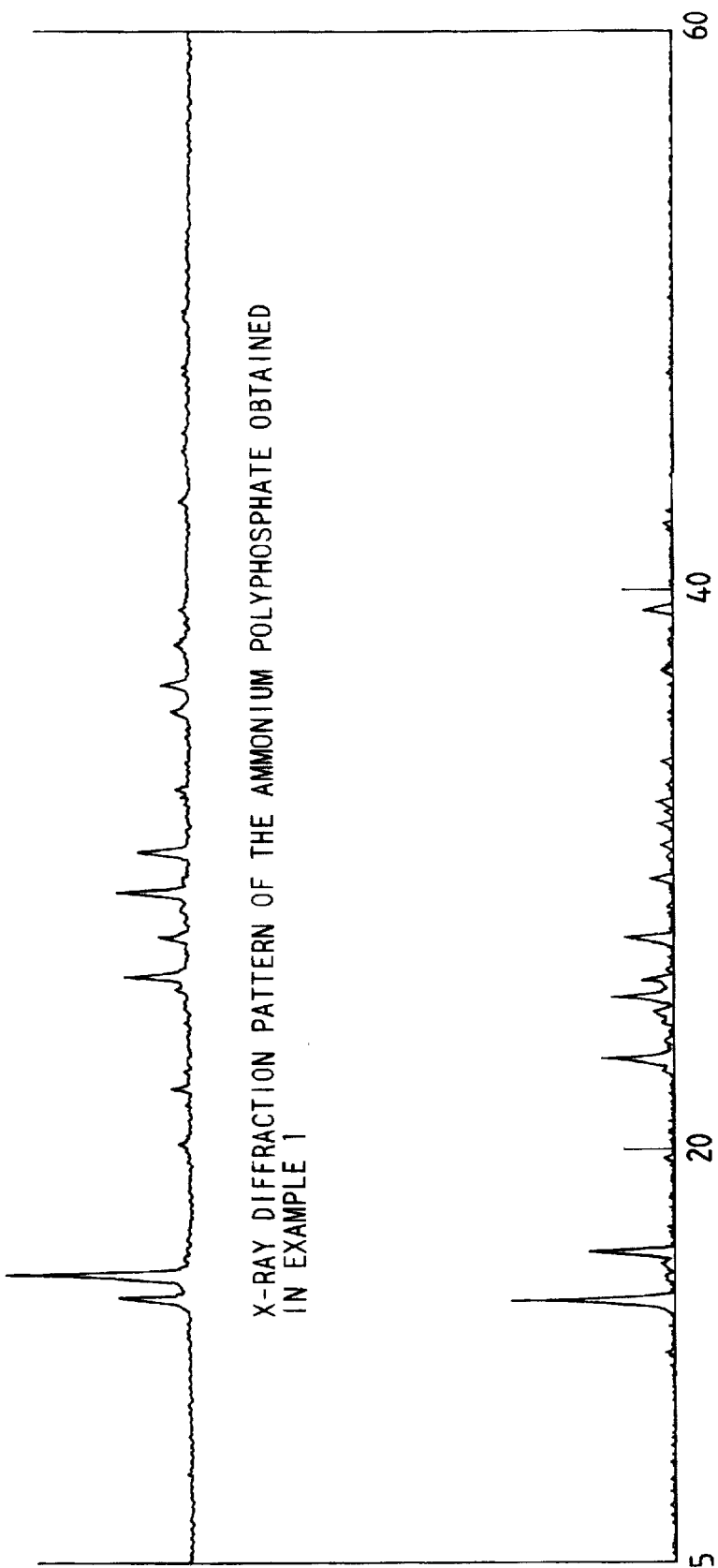

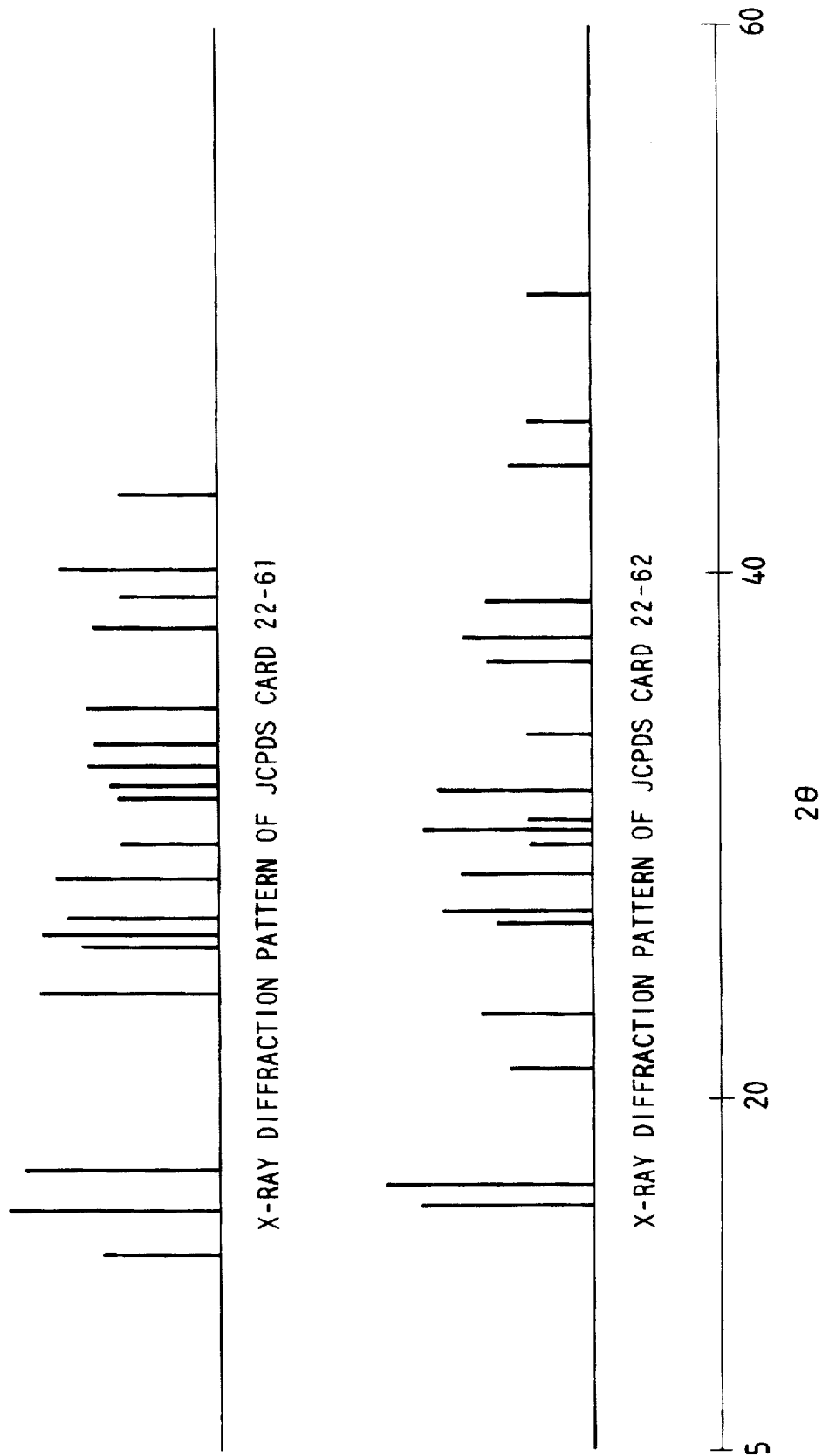

PROCESS FOR PRODUCING AMMONIUM POLYPHOSPHATE OF CRYSTALLINE FORM II

FIELD OF THE INVENTION

The present invention relates to a process for producing ammonium polyphosphate of crystalline form II (hereinafter referred to as II-form ammonium polyphosphate). More particularly, this invention relates to a process for producing II-form ammonium polyphosphate which comprises heating a mixture of a phosphate-containing substance and a condensation agent as starting materials in an ammoniacal wet air atmosphere in the presence of II-form ammonium polyphosphate as a compound for crystal formation (hereinafter referred to as "seed compound") to condense the starting materials.

BACKGROUND OF THE INVENTION

Ammonium polyphosphates are drawing attention in recent years as a flame retardant ingredient to be incorporated into synthetic resins. Such ammonium polyphosphates can exist in several crystalline forms, of which ammonium polyphosphate of crystalline form I (hereinafter referred to as I-form ammonium polyphosphate) can be synthesized relatively easily from a condensation agent and either phosphoric acid or a phosphate. However, the I-form ammonium polyphosphate, which is a particulate porous substance having an irregular surface appearance and high water solubility, has a drawback that when it is incorporated into a synthetic resin and moldings are produced from the synthetic resin, the ammonium polyphosphate and hydrolyzates thereof bleed out the molding surface to considerably reduce the electrical surface resistance of the moldings.

II-Form ammonium polyphosphate is a hardly water-soluble particulate substance having an exceeding smooth surface, and is already known as a flame retardant ingredient for use in synthetic resins.

II-Form ammonium polyphosphate has conventionally been produced from phosphorus pentoxide as a starting material. However, especial care should be taken in handling phosphorus pentoxide, because it is highly deliquescent and highly reactive and hence there is a fear that it may affect the living body. In addition, phosphorus pentoxide, which is produced from yellow phosphor obtained through high-temperature reduction of a phosphate ore by a dry process, has an industrial problem that this high-temperature reduction consumes a large quantity of energy and yields large quantities of industrial wastes as by-products.

On the other hand, the phosphates used as a starting material for I-form ammonium polyphosphate, in particular ammonium dihydrogen phosphate or diammonium hydrogen phosphate (hereinafter these phosphates are inclusively referred to simply as ammonium phosphate), are excellent in safety and handleability. Moreover, ammonium phosphate obtained by a wet process can be used as the starting material after purification. Ammonium phosphate is hence an extremely desirably starting material in industrial production. Consequently, in the production of II-form ammonium polyphosphate also, there is a strong desire for development of an efficient process in which ammonium phosphate is used as a starting material.

Known processes for producing II-form ammonium polyphosphate include a technique in which I-form ammonium polyphosphate obtained from ammonium phosphate and urea is heated to convert it into II-form ammonium polyphosphate. For example, C. Y. Shen et al. reported in *Journal of American Society*, Vol. 91, p. 62 (1969) that II-form ammonium polyphosphate was obtained by heating the I-form ammonium polyphosphate at 300° C. for 60 hours in a closed vessel, which was obtained by heating an equimolar mixture of ammonium phosphate and urea. However, this process, in which ammonium phosphate and urea as starting materials are heated and condensed to first produce I-form ammonium polyphosphate and this I-form ammonium polyphosphate is then converted to II-form ammonium polyphosphate, is defective in that the process is complicated and the production conditions and efficiency are utterly unsuitable for practical use.

On the other hand, JP-B-43-19218 (corresponding to U.S. Pat. No. 3,397,035) discloses a process for producing ammonium polyphosphate which comprises thermally condensing a composition comprising a phosphate-containing substance, an ammonifying agent, and a condensation agent in the presence of at least 1 part by weight of a substantially water-insoluble crystalline ammonium polyphosphate as a seed compound per 10 parts by weight of the composition, the thermal condensation being carried out at a temperature of about from 100° to 350° C. for a time period sufficient to convert the composition to the same crystalline ammonium polyphosphate as the ammonium polyphosphate used as the seed compound. (The term "JP-B" as used herein means an "examined Japanese patent publication".) However, there is a description in the above-cited reference to the effect that in carrying out the process the possibility of water being present in the reaction system should be avoided or minimized because the water resulting from the thermal condensation adversely affects the condensation product.

The present inventor made intensive studies in order to develop a process for easily obtaining high-purity II-form ammonium polyphosphate from a phosphate-containing substance and a condensation agent. As a result, it has been found that high-purity II-form ammonium polyphosphate is easily obtained by heating a mixture of a phosphate-containing substance and a condensation agent in an ammoniacal wet air atmosphere in the presence of II-form ammonium polyphosphate as a seed compound to condense the phosphate-containing substance with the condensation agent. The present invention has been completed based on this finding.

SUMMARY OF THE INVENTION

As apparent from the above description, the object of the present invention is to provide a process by which high-purity II-form ammonium polyphosphate can be easily produced.

The present invention resides in the following items.

(1) A process for producing II-form ammonium polyphosphate which comprises heating a mixture of a phosphate-containing substance and a condensation agent in an ammoniacal wet air atmosphere in the presence of II-form ammonium polyphosphate as a compound for crystal formation (seed compound) to condense the phosphate-containing substance with the condensation agent.

(2) The process for producing II-form ammonium polyphosphate as described in (1) above, wherein the phosphate-containing substance is a compound comprising at least one member selected from the group consisting of ammonium dihydrogen phosphate, diammonium hydrogen phosphate, triammonium phosphate, monoammonium amidophosphate, diammonium amidophosphate, urea phosphate, and low condensates of either phosphoric acid or ammonium phosphate which condensates are represented by the formula $xA_2O.yP_2O_5$, wherein A is H or an $NH_4$ group and $2 \geq R > 0$ where $R=x/y$.

(3) The process for producing II-form ammonium polyphosphate as described in (1) above, wherein the condensation agent is a compound comprising at least one member selected from the group consisting of urea, ammonium carbonate, biuret, guanylurea, methylurea, aminourea, 1,3-diaminourea, and diurea.

(4) The process for producing II-form ammonium polyphosphate as described in (1) above, wherein the molar ratio of the phosphate-containing substance to the condensation agent is from 0.2 to 2, and the weight ratio of the sum of the phosphate-containing substance and the condensation agent as starting materials to the seed compound is from 0.5 to 50.

(5) The process for producing II-form ammonium polyphosphate as described in (1) above, wherein the ammoniacal wet air has an ammonia concentration of from 0.05 to 10% by volume and a water concentration of from 1 to 30% by volume.

(6) The process for producing II-form ammonium polyphosphate as described in (1) above, wherein the thermal condensation is carried out at a temperature of from 250° C. to 320° C.

BRIEF DESCRIPTION OF THE DRAWINGS

FIG. 1 shows the X-ray diffraction pattern of the ammonium polyphosphate obtained in Example 1 and the X-ray diffraction pattern of the ammonium polyphosphate obtained in Comparative Example 2.

FIG. 2 shows the X-ray diffraction pattern of JCPDS card 22-61 and the X-ray diffraction pattern of JCPDS card 22-62.

DETAILED DESCRIPTION OF THE INVENTION

Examples of the phosphate-containing substance for use in the present invention include ammonium dihydrogen phosphate, diammonium hydrogen phosphate, triammonium phosphate, monoammonium amidophosphate, diammonium amidophosphate, urea phosphate, and low condensates of either phosphoric acid or ammonium phosphate which condensates are represented by the formula $xA_2O.yP_2O_5$, wherein A is H or an $NH_4$ group and $2 \geq R > 0$ where $R=x/y$. Preferred of these is ammonium dihydrogen phosphate or diammonium hydrogen phosphate. Examples of the condensation agent include urea, ammonium carbonate, biuret, guanylurea, methylurea, aminourea, 1,3-diaminourea, and diurea. Preferred of these is urea. The II-formammonium polyphosphate for use as a seed compound may be a commercial product, and examples thereof include EXOLIT 422 (manufactured by Hoechst A. G.), PHOSCHEK P/40 (manufactured by Monsanto Co.), and TERRAJU S10 (manufactured by Chisso Corp., Japan). Also usable as the seed compound is the II-form ammonium polyphosphate obtained by the process of the present invention.

An example of the process of the present invention for producing II-form ammonium polyphosphate is described below in detail. Ammonium phosphate as a phosphate-containing substance serving as a starting material is mixed with urea as a condensation agent serving as another starting material in a molar ratio of the phosphate-containing substance to the condensation agent of from 0.2 to 2, preferably from 0.3 to 1. The starting materials are mixed with II-form ammonium polyphosphate as a seed compound in a weight ratio of the starting materials to the seed compound of from 0.5 to 50, preferably from 1 to 15. The resulting mixture is put on a porcelain dish, which is placed in a semi-sealed glass pipe. This glass pipe is heated in a cylindrical electric oven so that the mixture is heated to a temperature in the range of from 250° to 320° C., preferably from 270° to 310° C., to condense the starting materials. In carrying out this thermal condensation, ammoniacal wet air having an ammonia concentration of from 0.05 to 10% by volume and a water concentration of from 1 to 30% by volume is passed through the glass pipe. The flow rate of the ammoniacal wet air is from 10 to 100N l/hr, preferably from 30 to 80N l/hr.

Vapor pressure of ammonia evolved from ammonium polyphosphate is high at a temperature of from 250° to 320° C., and when cooled from that temperature to about a room temperature, ammonia is eliminated from the ammonium polyphosphate in the proportion of a difference in vapor pressure corresponding to the difference in temperature. Because the difference in vapor pressure of ammonia is small at a comparatively low temperature of from 100° to 150° C., ammonia is less eliminated therefrom. A step of aging ammonium polyphosphate in an ammonia atmosphere at the comparatively low temperature is called an ammonia aging.

The ammonium polyphosphate obtained is ascertained to have crystalline form II by the fact that it gives the same X-ray diffraction peaks as in JCPDS card 22-62 (see FIG. 2).

In the conventional processes in which ammonium phosphate and urea are used as starting materials, only I-form ammonium polyphosphate is obtained. Hence, in order to obtain II-form ammonium polyphosphate, it has been necessary to use other starting materials or to convert the I-form ammonium polyphosphate to II-form ammonium polyphosphate through complicated steps. In contrast, according to the process of the present invention, high-purity II-form ammonium polyphosphate can be directly obtained with ease without via I-form ammonium polyphosphate by heating a mixture of a phosphate-containing substance and a condensation agent as starting materials, e.g., ammonium phosphate and urea, in an ammoniacal wet air atmosphere in the presence of II-form ammonium polyphosphate as a seed compound to condense the starting materials.

The present inventor presumes that the process of the present invention, in which high-purity II-form ammonium polyphosphate is easily obtained, proceeds by the following mechanism.

First, ammonium phosphate and urea as starting materials are condensed by heating to yield a melt consisting mainly of either amorphous ammonium polyphosphate or a partly unammonified ammonium polyphosphate. When wet ammoniacal air is passed over this melt, the hydroxyl groups of the melt are partly neutralized into ammonium salt form and, simultaneously therewith, crystal lattices are formed, finally giving II-form ammonium polyphosphate. It is thought that in the crystal formation, the ammonium polyphosphate as seed compound serves to determine the crystalline form which the melt comes to have, while the ammonia and the water present in the atmosphere accelerate the growth of crystals and further serve an important function in inhibiting conversion to a crystalline form other than that of the seed compound used. Ammonium polyphosphate having crystalline form II, which is the same as the crystalline form of the seed compound, is thought to be thus formed.

I-form ammonium polyphosphate herein means that which gives the same X-ray diffraction peaks as in JCPDS card 22-61 (see FIG. 2). Amorphous ammonium polyphosphate herein means the ammonium polyphosphate having no crystalline form, i.e., giving no X-ray diffraction peaks. Further, II-form ammonium polyphosphate herein means that which gives the same X-ray diffraction peaks as in JCPDS card 22-62 (see FIG. 2).

Examples and Comparative Examples are given below in order to explain the present invention in detail, but the invention should not be construed as being limited thereto.

All the percentages hereafter are by weight unless otherwise indicated.

X-ray diffraction analysis was performed by the powder method using X-ray diffractometer Geigerflex Type RAD-1B (manufactured by Rigaku Denki K.K., Japan).

EXAMPLE 1

Diammonium hydrogen phosphate in an amount of 6.6 g (0.05 mol) was sufficiently mixed with 9 g (0.15 mol) of urea and 1.56 g of II-form ammonium polyphosphate (TERRAJU S10) as a seed compound, and the resulting mixture was put on a boat-form porcelain dish. This porcelain dish was placed in a semi-sealed glass pipe having a gas introduction inlet. The mixture was heated to 299° C. in a cylindrical electric oven to condense the starting materials. Simultaneously with the heating, ammoniacal wet air having an ammonia concentration of 3.5% by volume and a water concentration of 10.5% by volume was blown into the glass pipe for 1 hour at a rate of 40 l/hr in terms of flow rate at ordinary temperature (25° C.) and ordinary pressure (1 atm). Thereafter, the temperature in the electric oven was lowered to 150° C. and ammonia gas was blown into the glass pipe for 0.5 hour at a rate of 50 liters (25° C., 1 atm) per hour to age the condensate in an ammonia atmosphere.

Analysis of the thus-obtained powder by X-ray diffractometry revealed that the powder consisted of ammonium polyphosphate 100% of which had the crystalline form II structure. The X-ray diffraction pattern thereof is shown in FIG. 1.

EXAMPLE 2

Heating, condensation, and aging in ammonia were carried out in the same manner as in Example 1, except that the time for passing ammoniacal wet air was changed to 30 minutes. Analysis of the thus-obtained powder by X-ray diffractometry revealed that the powder consisted of ammonium polyphosphate 100% of which had the crystalline form II structure.

EXAMPLE 3

Diammonium hydrogen phosphate in an amount of 6.6 g (0.05 mol) was sufficiently mixed with 3 g (0.05 mol) of urea and 0.96 g of II-form ammonium polyphosphate (TERRAJU S10) as a seed compound, and the resulting mixture was put on a boat-form porcelain dish. This porcelain dish was placed in a semi-sealed glass pipe having a gas introduction inlet. The mixture was heated to 308° C. in a cylindrical electric oven to condense the starting materials. Simultaneously with the heating, ammoniacal wet air having an ammonia concentration of 3.5% by volume and a water concentration of 11% by volume was blown into the glass pipe for 1 hour at a rate 50 liters (25° C., 1 atm) per hour. Thereafter, the temperature in the electric oven was lowered to 150° C. and ammonia gas was blown into the glass pipe for 1 hour at a rate of 50 liters (25° C., 1 atm) per hour to age the condensate in an ammonia atmosphere.

Analysis of the thus-obtained powder by X-ray diffractometry revealed that the powder consisted of ammonium polyphosphate 100% of which had the II-form crystalline structure.

EXAMPLE 4

Heating, condensation, and aging in ammonia were carried out in the same manner as in Example 1, except that the heating temperature was changed to 272° C.

Analysis of the thus-obtained powder by X-ray diffractometry revealed that the powder consisted of ammonium polyphosphate 98% of which had the crystalline form II structure.

EXAMPLE 5

Heating, condensation, and aging in ammonia were carried out in the same manner as in Example 1, except that 15.6 g of the II-form ammonium polyphosphate obtained in Example 1 was used as a seed compound, and that the heating temperature was changed to 305° C.

Analysis of the thus-obtained powder by X-ray diffractometry revealed that the powder consisted of ammonium polyphosphate 100% of which had the crystalline form II structure.

EXAMPLE 6

Heating, condensation, and aging in ammonia were carried out in the same manner as in Example 1, except that 0.32 g of the II-form ammonium polyphosphate obtained in Example 1 was used as a seed compound.

Analysis of the thus-obtained powder by X-ray diffractometry revealed that the powder consisted of ammonium polyphosphate 95% of which had the crystalline form II structure.

EXAMPLE 7

Ammonium dihydrogen phosphate in an amount of 5.8 g (0.05 mol) was sufficiently mixed with 9 g (0.15 mol) of urea and 1.48 g of II-form ammonium polyphosphate (TERRAJU S10) as seed crystals, and the resulting mixture was put on a boat-form porcelain dish. This porcelain dish was placed in a semi-sealed glass pipe having a gas introduction inlet. The mixture was heated to 300° C. in a cylindrical electric oven to condense the starting materials. Simultaneously with the heating, ammoniacal wet air having an ammonia concentration of 3.5% by volume and a water concentration of 10.5% by volume was blown into the glass pipe for 1 hour at a rate of 40 liters (25° C., 1 atm) per hour. Thereafter, the temperature in the electric oven was lowered to 150° C. and ammonia gas was blown into the glass pipe for 0.5 hour at a rate of 50 liters (25° C., 1 atm) per hour to age the condensate in an ammonia atmosphere.

Analysis of the thus-obtained powder by X-ray diffractometry revealed that the powder consisted of ammonium polyphosphate 100% of which had the crystalline form II structure.

Comparative Example 1

Heating, condensation, and aging in ammonia were carried out in the same manner as in Example 1, except that in place of the ammoniacal wet air, water-free dry ammonia gas was blown at a rate of 40 liters (25° C., 1 atm) per hour.

Analysis of the thus-obtained powder by X-ray diffractometry revealed that the powder consisted of ammonium polyphosphate having almost no crystalline form II structure and made up mainly of crystalline form I.

Comparative Example 2

Heating, condensation, and aging in ammonia were carried out in the same manner as in Example 1, except that the thermal condensation was conducted in the absence of II-form ammonium polyphosphate as a seed compound.

Analysis of the thus-obtained powder by X-ray diffractometry revealed that the powder consisted of I-form ammonium polyphosphate having almost no crystalline form II structure. The X-ray diffraction pattern thereof is shown in FIG. 1.

According to the process of the present invention, high-purity II-form ammonium polyphosphate can be directly obtained With ease without via I-form ammonium polyphosphate by heating a mixture of a phosphate-containing substance and a condensation agent as starting materials in an ammoniacal wet air atmosphere in the presence of II-form ammonium polyphosphate as a seed compound to condense the starting materials.

While the invention has been described in detail and with reference to specific embodiments thereof, it will be apparent to one skilled in the art that various changes and modifications can be made therein without departing from the spirit and scope thereof.

What is claimed is:

1. A process for producing ammonium polyphosphate of crystalline form II which comprises heating a mixture of a phosphate-containing substance and a condensation agent in an ammoniacal wet air atmosphere in the presence of ammonium polyphosphate of crystalline form II as a compound for crystal formation to condense the phosphate-containing substance with the condensation agent, wherein said ammoniacal wet air atmosphere is added to said mixture.

2. The process for producing ammonium polyphosphate of crystalline form II as claimed in claim 1, wherein the phosphate-containing substance is a compound comprising at least one member selected from the group consisting of ammonium dihydrogen phosphate, diammonium hydrogen phosphate, triammoniumphosphate, monoammonium amidophosphate, diammonium amidophosphate, urea phosphate, and low condensates of either phosphoric acid or ammonium phosphate which condensates are represented by the formula $xA_2O \cdot yP_2O_5$, wherein A is H or an $NH_4$ group and $2 \geq R > 0$ where $R = x/y$.

3. The process for producing ammonium polyphosphate of crystalline form II as claimed in claim 1, wherein the condensation agent is a compound comprising at least one member selected from the group consisting of urea, ammoniumcarbonate, biuret, guanylurea, methylurea, aminourea, 1,3-diaminourea, and diurea.

4. The process for producing ammonium polyphosphate of crystalline form II as claimed in claim 1, wherein the molar ratio of the phosphate-containing substance to the condensation agent is from 0.2 to 2, and the weight ratio of the sum of the phosphate-containing substance and the condensation agent as starting materials to the seed compound is from 0.5 to 50.

5. The process for producing ammonium polyphosphate of crystalline form II as claimed in claim 1, wherein the ammoniacal wet air has an ammonia concentration of from 0.05 to 10% by volume and a water concentration of from 1 to 30% by volume.

6. The process for producing ammonium polyphosphate of crystalline form II as claimed in claim 1, wherein the thermal condensation is conducted at a temperature of from 250° C. to 320° C.

* * * * *